United States Patent
Goel

(10) Patent No.: US 10,004,010 B2
(45) Date of Patent: Jun. 19, 2018

(54) USER EQUIPMENT SELECTION FOR DETECTING PHYSICAL CELL IDENTIFIER CONFUSION

(71) Applicant: Altiostar Networks, Inc., Tewksbury, MA (US)

(72) Inventor: Anupam Kumar Goel, Bangalore (IN)

(73) Assignee: AltioStar Networks, Inc., Tewksbury, MA (US)

( * ) Notice: Subject to any disclaimer, the term of this patent is extended or adjusted under 35 U.S.C. 154(b) by 68 days.

(21) Appl. No.: 14/991,437

(22) Filed: Jan. 8, 2016

(65) Prior Publication Data

US 2017/0201900 A1     Jul. 13, 2017

(51) Int. Cl.
| | |
|---|---|
| *H04L 1/00* | (2006.01) |
| *H04W 36/00* | (2009.01) |
| *H04W 4/02* | (2018.01) |
| *H04W 24/08* | (2009.01) |
| *H04W 24/02* | (2009.01) |

(52) U.S. Cl.
CPC ....... *H04W 36/0083* (2013.01); *H04W 4/025* (2013.01); *H04W 24/08* (2013.01); *H04W 24/02* (2013.01)

(58) Field of Classification Search
CPC ..... H04W 24/10; H04W 4/025; H04W 24/08; H04W 36/0083
See application file for complete search history.

(56) References Cited

U.S. PATENT DOCUMENTS

| | | | | |
|---|---|---|---|---|
| 2006/0046759 A1* | 3/2006 | Yoon | ................... | H04W 76/005 455/518 |
| 2012/0040696 A1* | 2/2012 | Siomina | ................ | G01S 5/0036 455/456.6 |
| 2015/0304891 A1* | 10/2015 | Dinan | ................ | H04W 72/0413 370/331 |
| 2016/0084936 A1* | 3/2016 | Smith | ................... | H04W 64/00 455/456.1 |
| 2016/0148218 A1* | 5/2016 | Koch | ................. | G06Q 30/0201 705/7.29 |

* cited by examiner

*Primary Examiner* — Ayaz Sheikh
*Assistant Examiner* — Hai-Chang Hsiung
(74) *Attorney, Agent, or Firm* — Mintz Levin Cohn Ferris Glovsky and Popeo, P.C.

(57) ABSTRACT

Measurement reports are received from a plurality of user equipment (UE) in communication with a first base station on a network. The measurement reports include data characterizing physical cell identifiers (PCIDs) of neighboring base stations and signal strengths associated with the neighboring base stations. Relative positions of the plurality of UEs are determined based on the received measurement reports. The plurality of UEs are associated into one or more groups comprising UEs having similar relative positions. A UE is selected from each of the one or more groups for transmission of a request to resolve at least some of the neighboring base station cell global identities (CGIs). At least one of the receiving, determining, associating, and selecting are performed by at least one data processor forming part of at least one computing system. Related apparatus, systems, techniques, and articles are also described.

27 Claims, 5 Drawing Sheets

USER EQUIPMENT SELECTION FOR DETECTING PHYSICAL CELL IDENTIFIER CONFUSION

TECHNICAL FIELD

The subject matter described herein generally relates to user equipment (UE) selection for detecting physical cell identifier (PCID) confusion in cellular networks, for example, a long-term evolution network.

BACKGROUND

A physical cell identifier (PCID) is an identification of a sector or cell at the physical layer. The Primary Sync Signal (PSS) or physical layer ID and the Secondary Sync Signal (SSS), which is a physical layer cell ID group number, determine the PCID. In some networks, the physical layer ID can have values between zero and two, while the cell ID group number can have values between 0 and 167. The PCID can be determined from the physical layer ID and the physical layer cell ID group number as three times the cell ID group number plus the physical layer ID number. Thus, the PCID can take values between 0 and 503.

Because the number of available PCIDs are limited (e.g., in existing systems PCIDs can only have values between 0 and 503), PCID reuse is required in a cellular network. PCIDs are typically assigned manually (e.g., by an operator) when a sector is brought into service. However, for a given sector, when two (or more) neighboring sectors use the same PCID, confusion can occur during user equipment (UE) handoff between sectors. PCID confusion can lead to failed handovers and dropped UEs. Because the numbers of sectors cellular networks utilize are increasing, the occurrence of PCID confusion is increasing.

While a UE can report each neighboring base station's cell global identity (CGI), which is a unique identifier, the UE requires significant UE processing to report CGI and CGI reporting increases network control traffic. As a result, it may be impracticable for a base station to request each UE to report neighboring base station CGI in order to detect a PCID confusion scenario. Relying on a randomly selected UE limits processing and network traffic requirements, but delays resolution of PCID confusion (leading to reduction in handover performance) and does not guarantee that a PCID confusion scenario will be identified because the randomly selected UE may not be able to report the CGI of all neighboring base stations that may contribute to the PCID confusion scenario.

SUMMARY

In an aspect, measurement reports are received from a plurality of user equipment (UE) in communication with a first base station on a network. The measurement reports include data characterizing physical cell identifiers (PCIDs) of neighboring base stations and signal strengths associated with the neighboring base stations. Relative positions of the plurality of UEs are determined based on the received measurement reports. The plurality of UEs are associated into one or more groups comprising UEs having similar relative positions. A UE is selected from each of the one or more groups for transmission of a request to resolve at least some of the neighboring base station cell global identities (CGIs). At least one of the receiving, determining, associating, and selecting are performed by at least one data processor forming part of at least one computing system.

One or more of the following features can be included in any feasible combination. For example, a request can be transmitted to report neighboring base station CGIs. The measurement reports received from the plurality of UEs can include, for each UE, a listing of the neighboring base stations that one of the plurality of UE measured received signal strength. Each measurement report can order neighboring base stations according to the received signal strength. The measurement reports can include ordered lists of neighboring base stations ordered by signal strength of each neighboring base station as received by one of the plurality of UE.

The relative positions of the plurality of UEs can be characterized by their respective measurement reports. The relative positions of the plurality of UEs can be defined as an order of the strongest N neighboring base stations in their measurement reports, and N can be 4. The measurement reports can include ordered lists of neighboring base stations ordered by signal strength of each neighboring base station as received by one of the plurality of UE. The associating UEs into one or more groups can include comparing the ordered lists and associating UEs having the same order of the strongest N base stations into a group and N can be an integer. UEs in the plurality of UEs can have similar relative positions when the UEs have the same order of the strongest N base stations.

The neighboring base stations can include the first base station. Whether there is PCID confusion in the network can be determined using CGIs received from the selected UEs. An instruction can be transmitted indicating presence of PCID confusion in the network.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel. Such units include but are not limited to so-called "Graphics Processing Units (GPU)."

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

Like reference symbols in the various drawings indicate like elements.

DETAILED DESCRIPTION

In some implementations, the current subject includes determining relative positions of UEs connected to a service base station and selecting a subset of the UEs that are connected to the service base station to perform CGI processing. By selecting a subset of UEs that are in different relative positions, PCID confusion can be detected while reducing impact on network performance. Relative positions can be determined using measurement reports received by the UEs such that UEs are considered to be in similar positions if they have similar relative measurement reports characterizing the signal strength from each neighboring base station. Once CGIs of neighboring base stations are received and a comparison made to determine whether there is a one to one mapping of PCID to CGI values, a PCID confusion scenario can be detected. In some implementations, the current subject matter can be implemented in a wireless communication system, such as a long-term evolution system, where some of its components are discussed below.

Figure 1:
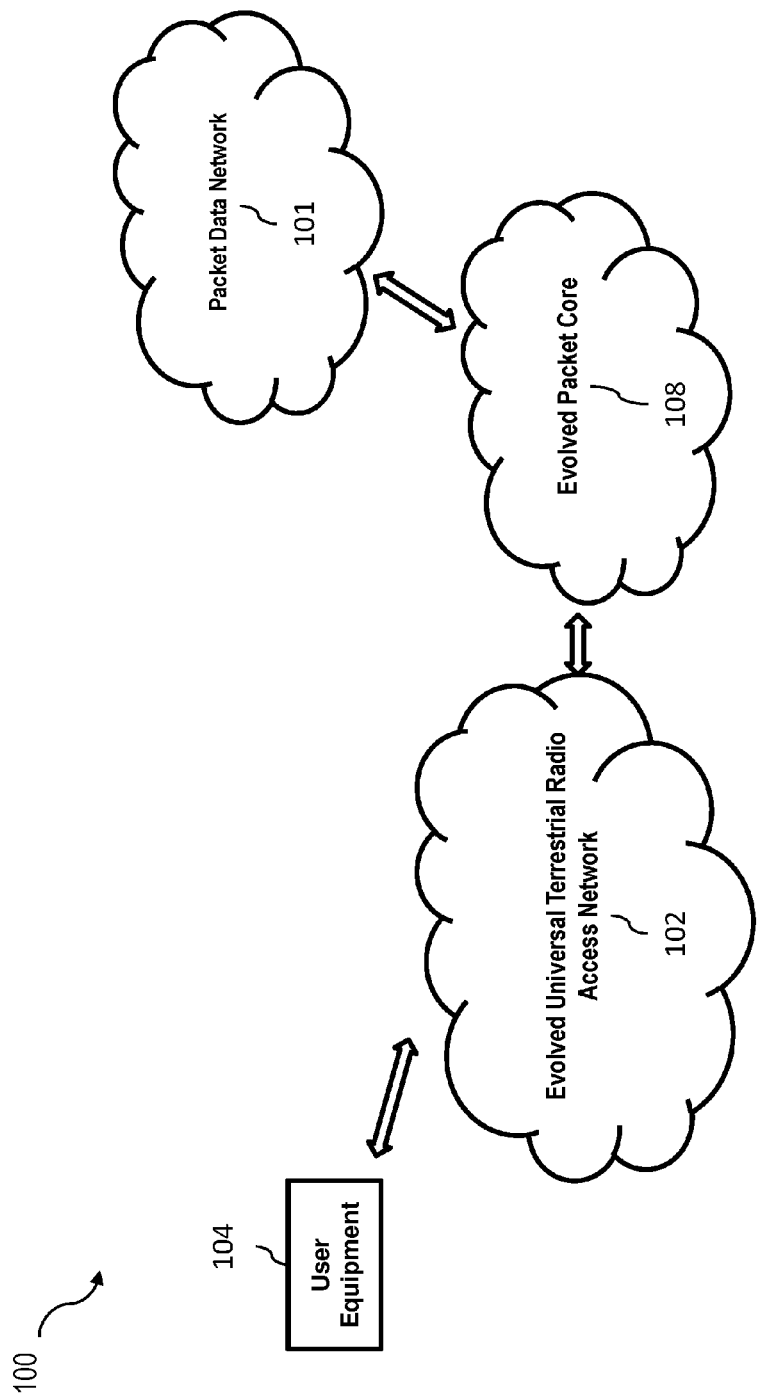
FIGS. 1 and 2 illustrate an exemplary conventional communication system along with its various components.
Figure 2:
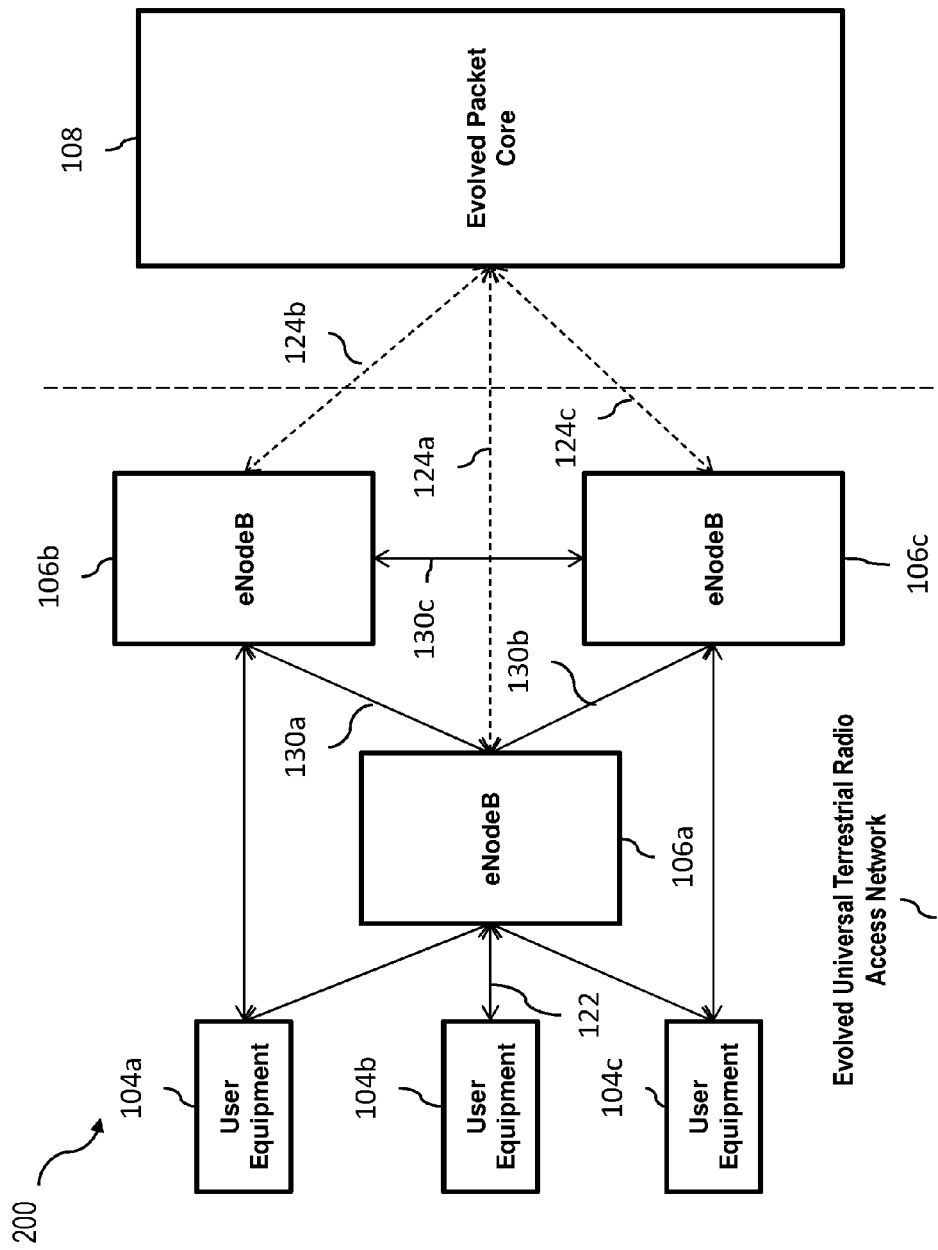

FIGS. 1 and 2 illustrate an exemplary conventional long-term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

As shown in FIG. 1, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility, and services for the user equipment 104.

FIG. 1 illustrates an example network 100. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs) will serve the user equipment 104 and for protocol features like header compression and encryption. The eNodeB s 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 2, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME. In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 2, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane and the other for the user plane.

Figure 3:
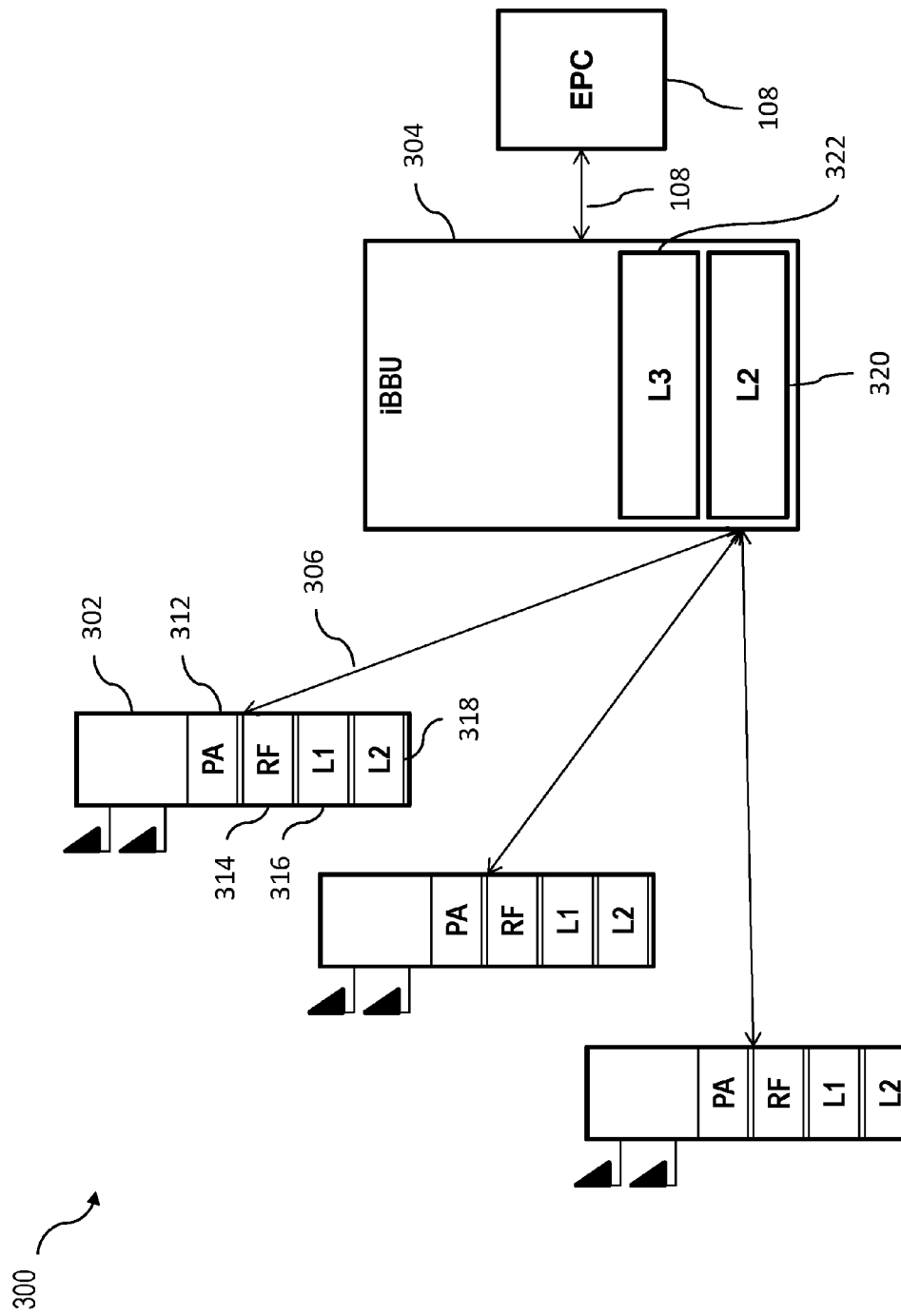
FIG. 3 illustrates an exemplary system, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU") 304. The iRRH 302 and iBBU 304 can be connected using Ethernet fronthaul ("FH") communication 306 and the iBBU 304 can be connected to an evolved packet core ("EPC") using backhaul ("BH") communication 108. The user equipment (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with radio link control ("RLC") and a packet data convergence protocol ("PDCP"). The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/ protocols associated with PDCP. Thus, the system 300 can be configured to split functionalities/protocols associated with PDCP between iRRH 302 and the iBBU 304.

In some implementations, the system 300 can form part of an evolved Node B ("eNodeB" or "eNB") and there may be a plurality of eNBs interconnected with one another using an interface (e.g., X2). The interface can be established between two eNodeBs in order to provide an exchange of signals, which can include a load- or interference-related information as well as handover-related information. The eNodeBs can communicate with the evolved packet core EPC 108.

In some implementations, the system 300 can implement UE selection for detecting a PCID confusion condition within the network as well as PCID confusion remediation.

Figure 4:
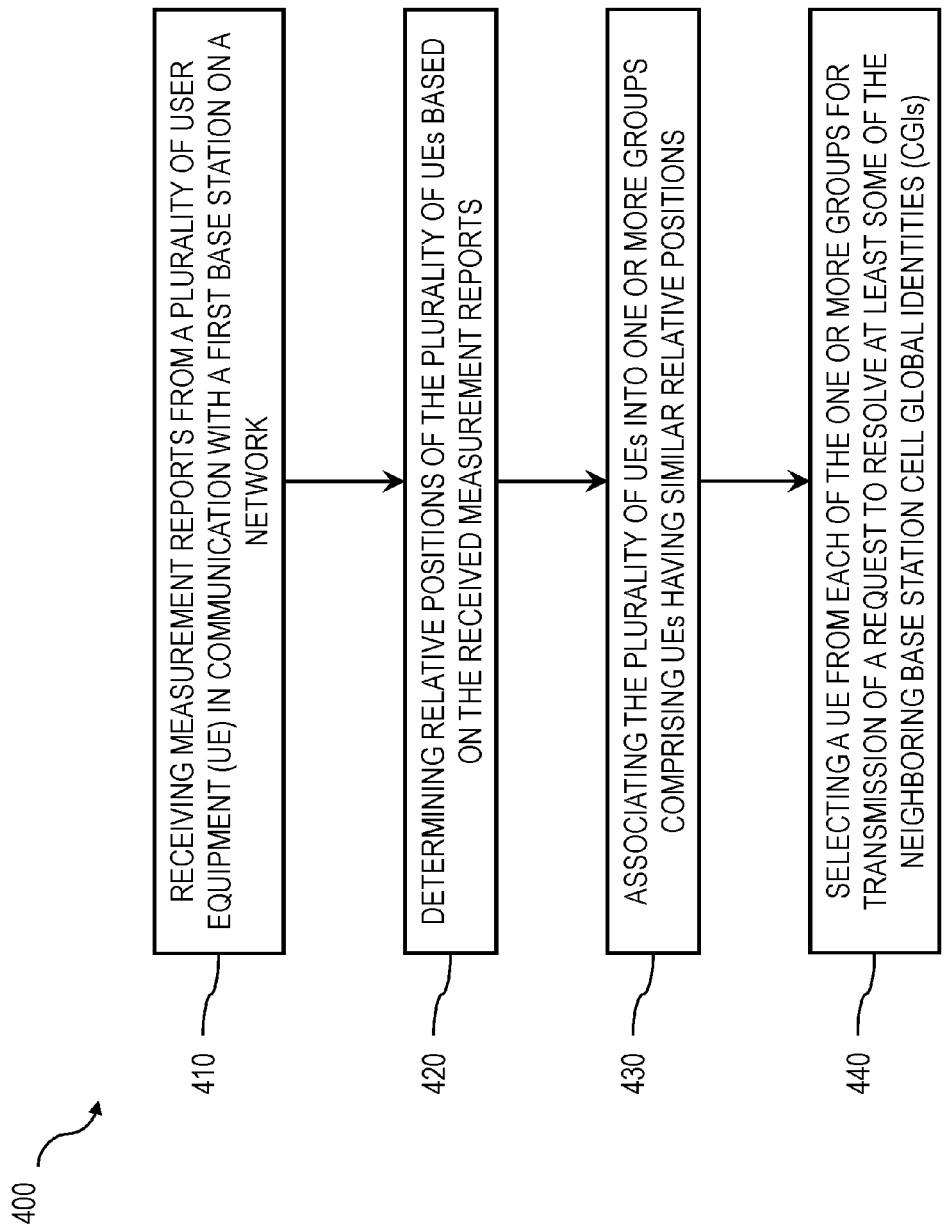
FIG. 4 is a process flow diagram illustrating an exemplary process for selecting one or more UE for PCID confusion detection using UE reporting, according to some implementations of the current subject matter.

FIG. 4 is a process flow diagram illustrating an exemplary process 400, which, for example, a base station, such as an eNodeB, may implement, according to some implementations of the current subject matter. The exemplary process 400 can be used for selecting and/or determining which UEs (connected to the service base station) that the service base station will be asking to report their neighboring base station CGIs. The exemplary process 400 can allow for only a subset of UEs to report neighboring base station CGIs thereby reducing the burden on the network while also ensuring a high likelihood that, if a PCID confusion scenario is present, it will be detected.

Figure 5:
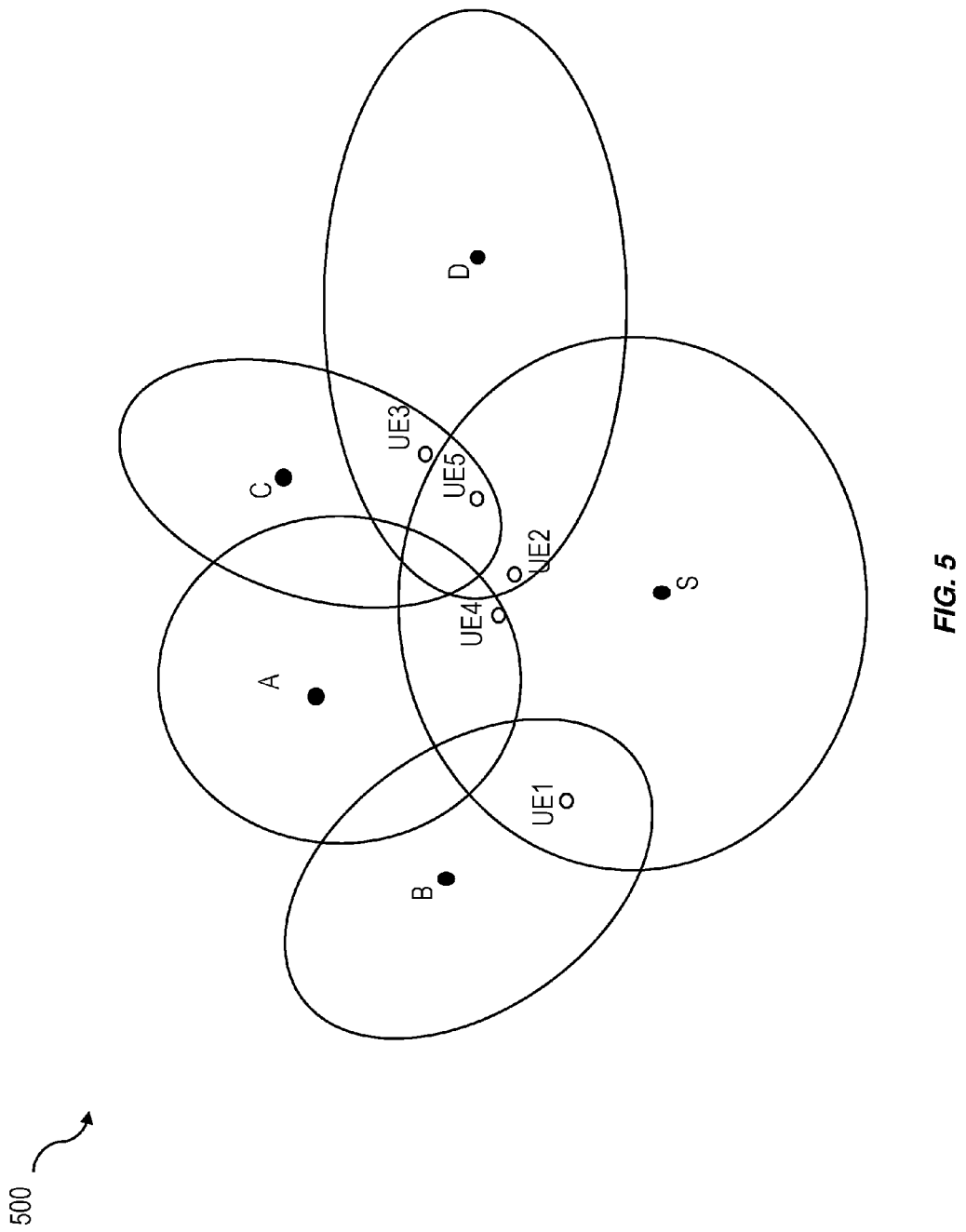
FIG. 5 is a sector block diagram of an exemplary network with PCID confusion, according to some implementations of the current subject matter.

At 410, measurement reports can be received from multiple UEs in communication with a service base station. The UEs can be within the coverage area (e.g., within a sector) of the base station (e.g., an eNodeB). A measurement report supplied by each UE can include PCIDs of neighboring base stations and their signal strength, as measured by the UE. For example, FIG. 5 is a sector block diagram of an exemplary network having a service base station S and neighboring base stations (A, B, C, and D) and UEs (UE1, UE2, UE3, UE4, and UE5). Network coverage is illustrated by concentric circles or ovals centered upon respective base stations. Signal strength between a given UE and a base station can vary with distance, time, and/or any other additional factors and/or any combination of factors. For simplicity and illustration purposes only, FIG. 5 shows each base station as having a single sector, although it is contemplated that base stations can have multiple sectors. Periodically and/or upon request, each UE can create a measurement report that can include the PCID and/or signal strength of each base station from which the respective UE can measure a signal. For example, UE1 can report that it can measure a signal from base stations A and B and that the received signals, ordered from strongest to weakest, is B, A. It is noted that while coverage areas are indicated by concentric circles in FIG. 5, UEs outside a coverage area for a given base station can still be able to measure received signals from that base station. In some implementations, the measurement report received from a UE can be in the form of a list of neighboring base stations and the list can be ordered by signal strength (e.g., from strongest to weakest and/or in any other fashion) of the neighboring base station, as received by the UE.

Referring back to FIG. 4, at 420, relative positions of the UEs can be determined based on the received measurement reports. The relative position of a UE can be characterized by and/or defined as an order of the strongest neighboring base stations in its measurement report. For example, the relative position of UE3 in the example of FIG. 5 is (D, C, A). Thus, two UEs having a similar relative position can reflect that the two UEs measure similar base signal strengths but need not necessarily be proximally geographically located.

In some implementations, only a predetermined number of the strongest signal base stations can define and/or characterize the relative position. For example, only the strongest four neighboring base stations (e.g., having the strongest signal strengths as measured by the UE) can define the relative position. For example, measurement reports can be truncated so that only the strongest four base stations are considered in the associated UEs relative position while relative positions of any additional base stations can be ignored.

At 430, the UEs can be associated into one or more groups having similar measurement reports. Two UEs can be associated together, for example, when their measurement reports include the same base stations having the same relative strengths. For example, with reference to FIG. 5, two UEs can be associated together if they both have a measurement report of (A, B, C). The association of UEs can be based on truncated measurement reports (e.g., based on only the first four base stations and their relative signal strength). In the exemplary implementation, where measurement reports include ordered lists of base stations that are ordered by relative signal strength, the associating of UEs into one or more groups can include a comparison of the ordered lists.

At 440, a UE can be selected from each of the one or more groups. The selection can be for transmission of a request to resolve at least some of the neighboring base station CGIs. In some implementations, a request to report neighboring base station CGIs can be transmitted to the selected UEs. The CGIs of neighboring base stations can be received from the selected UEs and can be used to determine whether there is PCID confusion in the network, for example, by comparing CGI and PCID of two or more neighboring base stations to determine whether there is or is not a one to one mapping of PCID to CGI values. If there is not (e.g., two CGI values are associated with the same PCID value), then it can be determined that PCID confusion conditions exist and an instruction can be transmitted indicating the presence of PCID confusion in the network so that remedial steps may be taken. The instruction can be transmitted to an element management system (EMS) server. The remedial steps can include, for example, reassignment of one or more PCID values to each base station.

By selecting UEs having different relative positions, the current subject matter reduces the number of UEs that are requested to resolve neighboring base station CGIs. In other words, the current subject matter can intelligently determine which UEs should be used by the network to detect for PCID confusion so as to reduce or minimize impact on network resources.

An example implementation of the process 400 of FIG. 4 is discussed with reference to FIG. 5 to resolve whether PCID confusion exists with respect to a PCID of one neighbor base station. As previously described, FIG. 5 is a sector block diagram of an exemplary network having service base station S and neighboring base stations (A, B, C, and D) and UEs (UE1, UE2, UE3, UE4, and UE5). Further, base station A has been assigned PCID of 100, base station B has been assigned PCID of 400, base station C has been assigned PCID of 200, and base station D has been assigned PCID of 400. Because base station B and base station D have the same PCID, a PCID confusion condition is present in this network.

Service base station S can request that each UE to which it is connected generate (e.g., UE1 to UE5) and send a measurement report, which can include each neighboring base station's PCID and their relative signal strength. Table 1 illustrates representations of the example measurement reports that service base station S can receive from the UEs. Relative position can be represented by an ordered list of base station PCID values, where the list can be ordered from strongest to weakest signal. In some implementations, measurement reports not having the PCID selected for confusion resolution as the strongest signal can be removed from consideration. For illustrative purposes, also listed are the base station names corresponding to the PCID values, although these indications would not be included in the measurement report received from each UE.

TABLE 1

Measurement Report.

| UE | Relative Position (PCID) | Relative Position (Base Station) |
|---|---|---|
| UE1 | <400, 100> | <B, A> |
| UE2 | <400, 100, 200> | <D, A, C> |
| UE3 | <400, 200, 100> | <D, C, A> |
| UE4 | <400, 100, 200> | <D, A, C> |
| UE5 | <400, 200, 100> | <D, C, A> |

The UEs can be grouped according to their relative positions so that they are grouped when they have similar relative positions, for example, when the ordered list of base stations are the same. Table 2 below illustrates the resulting groupings of UEs and their corresponding relative positions. For illustrative purposes, also listed are the base station names corresponding to the PCID values, although these indications would not be known to the base station before requesting CGI values.

TABLE 2

UE Groupings and Relative Positions.

| Group | UEs | Relative Position (PCID) | Relative Position (Base Station) |
|---|---|---|---|
| X | UE1 | <400, 100> | <B, A> |
| Y | UE2, UE4 | <400, 100, 200> | <D, A, C> |
| Z | UE3, UE5 | <400, 200, 100> | <D, C, A> |

One UE can be selected from each of group X, Y, and Z and a request to resolve the respective neighboring base station CGIs can be transmitted to each selected UE. For example, UE1, UE2, and UE3 can be selected. They can each request the CGI of their respective neighboring base stations and report the same to base station S. Base station S can compare the reported CGI against the previously provided PCID of each base station to see if there is a one to one mapping. In the illustrative example of FIG. 5, it can be determined that there is PCID confusion because PCID 400 would correspond to both the CGI of base station B and the CGI of base station D. Once PCID confusion is detected, remedial steps may be taken.

The subject matter described herein can provide many technical advantages. For example, the current subject matter enables faster PCID confusion detection with less throughput impact. The current subject matter can work well in dense urban topologies, where typically, a UE sees more than one neighbor.

Although a few variations have been described in detail above, other modifications or additions are possible. For example, the process 400 of detecting for PCID confusion can be performed periodically and/or in response to a condition, such as exceeding a certain rate of handover failures to a given PCID. PCID confusion can be detected for a single PCID at a time or for some and/or all neighboring base stations. The PCID selected for confusion resolution can be the strongest neighbor. The serving base station can maintain a list of neighboring PCIDs (e.g., in a neighboring relationship table) and the serving base station can confirm if one or more of the PCIDs are under confusion by selecting UEs according to the current subject matter to use for determining neighboring base station CGIs.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method, comprising:
   receiving measurement reports from a plurality of user equipment (UE) in communication with a first base station on a network, the measurement reports comprising data characterizing physical cell identifiers (PC-IDs) of neighboring base stations and signal strengths associated with the neighboring base stations;
   determining relative positions of the plurality of UEs based on the received measurement reports;
   associating the plurality of UEs into one or more groups comprising UEs having similar relative positions; and
   selecting a UE from each of the one or more groups for transmission of a request to resolve at least some of the neighboring base station cell global identities (CGIs);
   wherein the measurement reports include ordered lists of neighboring base stations ordered by signal strength of each neighboring base station as received by one of the plurality of UE;
   wherein the associating UEs into one or more groups includes comparing the ordered lists and associating UEs having a same order of a strongest N base stations into a group, wherein N is an integer;
   wherein at least one of the receiving, determining, associating, and selecting are performed by at least one data processor forming part of at least one computing system.

2. The method of claim 1, further comprising:
   transmitting a request to report neighboring base station CGIs.

3. The method of claim 1, wherein the measurement reports received from the plurality of UEs include, for each UE, a listing of the neighboring base stations that one of the plurality of UE measured received signal strength, wherein each measurement report orders neighboring base stations according to the received signal strength.

4. The method of claim 3, wherein the measurement reports include ordered lists of neighboring base stations ordered by signal strength of each neighboring base station as received by one of the plurality of UE.

5. The method of claim 1, wherein the relative positions of the plurality of UEs are characterized by their respective measurement reports.

6. The method of claim 1, wherein the relative positions of the plurality of UEs are defined as an order of the strongest N neighboring base stations in their measurement reports, wherein N is 4.

7. The method of claim 1, wherein UEs in the plurality of UEs have similar relative positions when the UEs have the same order of the strongest N base stations.

8. The method of claim 1, wherein the neighboring base stations include the first base station.

9. The method of claim 1, further comprising:
   determining, using CGIs received from the selected UEs, whether there is PCID confusion in the network; and
   transmitting an instruction indicating presence of PCID confusion in the network.

10. A system comprising:
    at least one data processor;
    memory storing instructions which, when executed by the at least one data processor, causes the at least one data processor to perform operations comprising:
    receiving measurement reports from a plurality of user equipment (UE) in communication with a first base station on a network, the measurement reports comprising data characterizing physical cell identifiers (PC-IDs) of neighboring base stations and signal strengths associated with the neighboring base stations;
    determining relative positions of the plurality of UEs based on the received measurement reports;
    associating the plurality of UEs into one or more groups comprising UEs having similar relative positions; and
    selecting a UE from each of the one or more groups for transmission of a request to resolve at least some of the neighboring base station cell global identities (CGIs)
    wherein the measurement reports include ordered lists of neighboring base stations ordered by signal strength of each neighboring base station as received by one of the plurality of UE;
    wherein the associating UEs into one or more groups includes comparing the ordered lists and associating UEs having a same order of a strongest N base stations into a group, wherein N is an integer.

11. The system of claim 10, the operations further comprising:
    transmitting a request to report neighboring base station CGIs.

12. The system of claim 10, wherein the measurement reports received from the plurality of UEs include, for each UE, a listing of the neighboring base stations that one of the plurality of UE measured received signal strength, wherein each measurement report orders neighboring base stations according to the received signal strength.

13. The system of claim 12, wherein the measurement reports include ordered lists of neighboring base stations ordered by signal strength of each neighboring base station as received by one of the plurality of UE.

14. The system of claim 10, wherein the relative positions of the plurality of UEs are characterized by their respective measurement reports.

15. The system of claim 10, wherein the relative positions of the plurality of UEs are defined as an order of the strongest N neighboring base stations in their measurement reports, wherein N is 4.

16. The system of claim 10, wherein UEs in the plurality of UEs have similar relative positions when the UEs have the same order of the strongest N base stations.

17. The system of claim 10, wherein the neighboring base stations include the first base station.

18. The system of claim 10, the operations further comprising:
    determining, using CGIs received from the selected UEs, whether there is PCID confusion in the network; and
    transmitting an instruction indicating presence of PCID confusion in the network.

19. A non-transitory computer program product storing instructions, which when executed by at least one data processor of at least one computing system, implement a operations comprising:
    receiving measurement reports from a plurality of user equipment (UE) in communication with a first base station on a network, the measurement reports comprising data characterizing physical cell identifiers (PC-IDs) of neighboring base stations and signal strengths associated with the neighboring base stations;
    determining relative positions of the plurality of UEs based on the received measurement reports;
    associating the plurality of UEs into one or more groups comprising UEs having similar relative positions; and
    selecting a UE from each of the one or more groups for transmission of a request to resolve at least some of the neighboring base station cell global identities (CGIs);
    wherein the measurement reports include ordered lists of neighboring base stations ordered by signal strength of each neighboring base station as received by one of the plurality of UE;
    wherein the associating UEs into one or more groups includes comparing the ordered lists and associating UEs having a same order of a strongest N base stations into a group, wherein N is an integer.

20. The computer program product of claim 19, the method further comprising:
    transmitting a request to report neighboring base station CGIs.

21. The computer program product of claim 19, wherein the measurement reports received from the plurality of UEs include, for each UE, a listing of the neighboring base stations that one of the plurality of UE measured received signal strength, wherein each measurement report orders neighboring base stations according to the received signal strength.

22. The computer program product of claim 21, wherein the measurement reports include ordered lists of neighboring base stations ordered by signal strength of each neighboring base station as received by one of the plurality of UE.

23. The computer program product of claim 19, wherein the relative positions of the plurality of UEs are characterized by their respective measurement reports.

24. The computer program product of claim 19, wherein the relative positions of the plurality of UEs are defined as an order of the strongest N neighboring base stations in their measurement reports, wherein N is 4.

25. The computer program product of claim 19, wherein UEs in the plurality of UEs have similar relative positions when the UEs have the same order of the strongest N base stations.

26. The computer program product of claim 19, wherein the neighboring base stations include the first base station.

27. The computer program product of claim 19, the method further comprising:
    determining, using CGIs received from the selected UEs, whether there is PCID confusion in the network; and
    transmitting an instruction indicating presence of PCID confusion in the network.

* * * * *